(12) United States Patent
Cuva et al.

(10) Patent No.: US 6,773,215 B2
(45) Date of Patent: Aug. 10, 2004

(54) FASTENER ASSEMBLY FOR USE WITH COMPOSITE ARTICLES

(75) Inventors: William J. Cuva, Jupiter, FL (US); Robert E. Warburton, Jupiter, FL (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 10/241,656

(22) Filed: Sep. 11, 2002

(65) Prior Publication Data

US 2004/0047711 A1 Mar. 11, 2004

(51) Int. Cl.[7] .............................................. F16B 21/16
(52) U.S. Cl. ..................................... 411/553; 411/552
(58) Field of Search ............................... 411/553, 549, 411/552

(56) References Cited

U.S. PATENT DOCUMENTS

| | | | | |
|---|---|---|---|---|
| 2,309,733 A | * | 1/1943 | Jones ........................ | 411/549 |
| 2,334,676 A | * | 11/1943 | Jones ........................ | 411/549 |
| 2,839,808 A | | 6/1958 | Zahodiakin | |
| 2,922,211 A | | 1/1960 | Boyd ......................... | 24/221 |
| 3,171,182 A | * | 3/1965 | Danehy ...................... | 411/552 |
| 3,486,205 A | | 12/1969 | Smith ........................ | 24/221 |
| 3,488,815 A | | 1/1970 | Metz .......................... | 24/211 |
| 3,675,280 A | | 7/1972 | Winslade .................. | 24/221 K |
| 3,930,428 A | | 1/1976 | Hale ......................... | 81/121 R |
| 4,126,338 A | | 11/1978 | Coel et al. ................. | 285/330 |
| 4,657,462 A | | 4/1987 | Hoen ......................... | 411/552 |
| 5,011,353 A | | 4/1991 | Boyd ......................... | 411/383 |
| 5,139,378 A | | 8/1992 | Fisher ....................... | 411/353 |
| 5,569,008 A | | 10/1996 | Chapkovich ............... | 411/383 |
| 5,620,291 A | | 4/1997 | Hayes et al. ............... | 411/552 |
| 5,634,754 A | | 6/1997 | Weddendorf ............... | 411/354 |
| 5,688,093 A | | 11/1997 | Bowers ...................... | 411/552 |
| 5,690,460 A | | 11/1997 | Attanasio ................... | 411/551 |
| 5,716,180 A | | 2/1998 | Bowers ...................... | 411/551 |
| 5,718,549 A | * | 2/1998 | Noda et al. ................ | 411/553 |
| 5,795,122 A | | 8/1998 | Bowers ...................... | 411/551 |
| 6,042,315 A | | 3/2000 | Miller et al. ............... | 411/411 |
| 6,045,310 A | | 4/2000 | Miller et al. ............... | 411/383 |
| 6,261,042 B1 | * | 7/2001 | Pratt ......................... | 411/551 |
| 6,267,543 B1 | | 7/2001 | David et al. ............... | 411/552 |
| 6,379,076 B1 | | 4/2002 | Reinhold et al. .......... | 403/348 |
| 6,409,446 B1 | | 6/2002 | Schwarz .................... | 411/552 |

OTHER PUBLICATIONS

European Search Report.

* cited by examiner

*Primary Examiner*—Frederick L. Lagman
(74) *Attorney, Agent, or Firm*—Kenneth C. Baran

(57) ABSTRACT

A fastener for securing a composite panel 14 to a noncomposite support 12 includes a composite stud 22 with a notched shank 26, and a collar 36 with an axis 38 and circumferentially extending ribs 56. When assembled, the ribs 56 and notches 28 engage each other to resist axial translation between the stud and the collar. In one embodiment, a spring 66 urges the rib into contact with the notch to tension the stud and clamp the panel to its support. In a second embodiment, the collar 36a has external threads. A nut 76 engages the threads to tension the stud and clamp the panel to its support. The spring 66 is optional in the second embodiment. Because the composite stud is susceptible to damage if exposed to excessive torque, both embodiments include features to minimize torque transfer to the stud during assembly and disassembly.

18 Claims, 4 Drawing Sheets

FIG.1
FIG.2
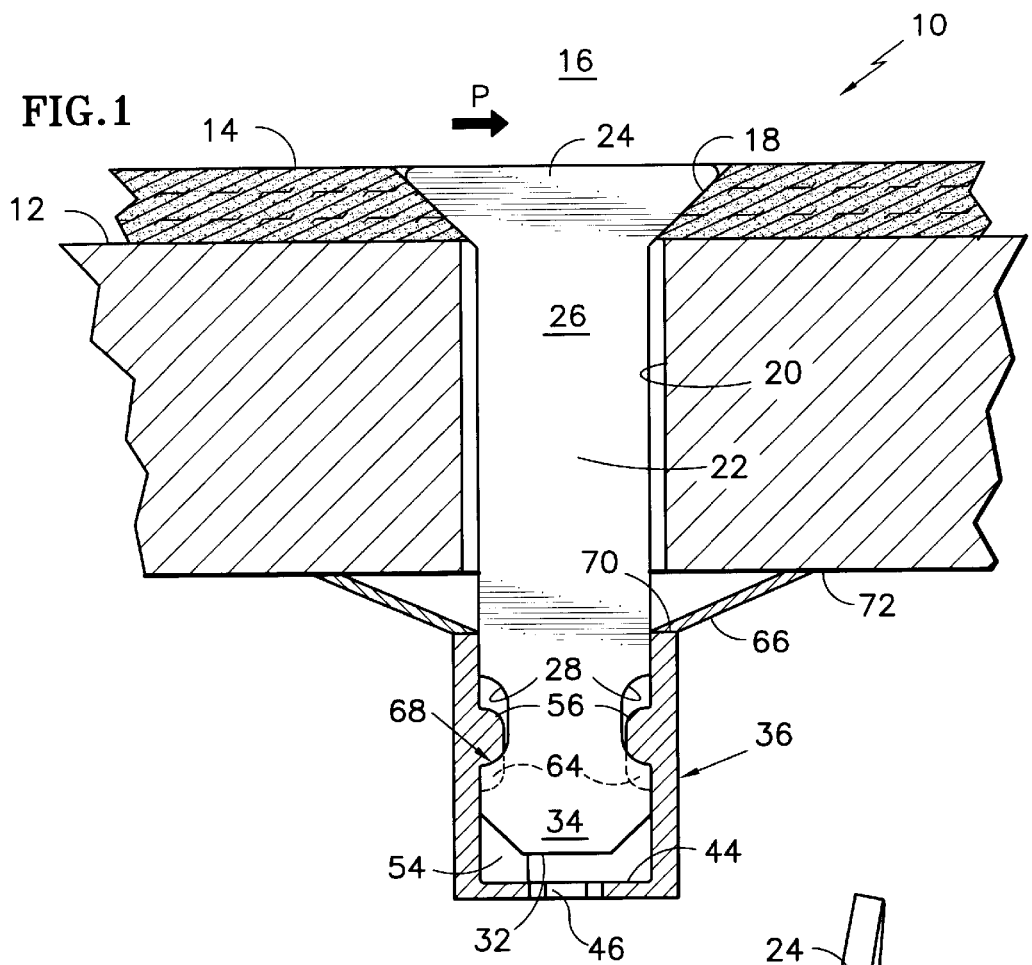
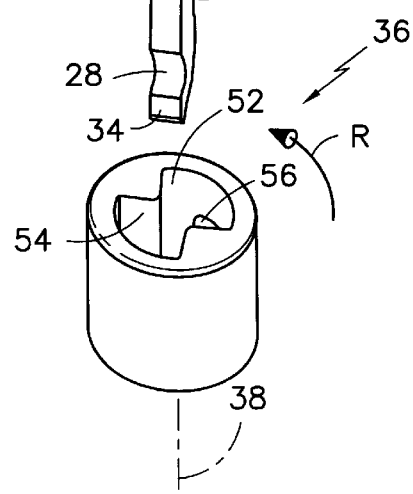

FASTENER ASSEMBLY FOR USE WITH COMPOSITE ARTICLES

STATEMENT OF GOVERNMENT INTEREST

This invention was made under a U.S. Government contract and the Government has rights therein.

TECHNICAL FIELD

This invention relates to fasteners, and particularly to a fastener assembly for securing a composite panel to a noncomposite support structure.

BACKGROUND OF THE INVENTION

Gas turbine engines include several components exposed to hot combustion gases. Among these components are combustion chambers, exhaust nozzles and afterburner liners. Each of these components bounds a portion of a gaspath that channels the combustion gases through the engine. It is desirable to construct these components of heat tolerant materials. Ceramic matrix composites (CMC's) are one class of materials known to possess the requisite temperature tolerance. CMC's include materials comprised of carbon or silicon carbide fibers in a carbon or silicon carbide matrix. However the composite materials themselves may not be able to withstand the severe structural demands imposed by a gas turbine engine. Accordingly, the aforementioned components may be comprised of a noncomposite support structure and a heat tolerant composite panel secured thereto. The composite panel shields the metal support structure to maintain the support structure within its operational limits.

Securing composite panels to a support structure is a considerable technical challenge. Mechanical fasteners, such as nut and bolt assemblies, are attractive for securing a panel to its support because they allow for convenient removal of damaged panels. However metallic mechanical fasteners are unsatisfactory because any portion of the metal fastener exposed to the hot combustion gases will negate the advantages of the composite panels. Composite fasteners may be used instead, however composite fasteners are considerably weakened by the presence of threads and therefore threaded composite fasteners may not reliably secure the panel to its support. Accordingly, it is desirable that a composite fastener assembly either avoid the use of threads, or employ threads in a way that safeguards the integrity of the fastener.

U.S. Pat. Nos. 6,042,315 and 6,045,310 present a unique solution to the problem of attaching a composite panel 30 to a noncomposite back structure 32. The disclosed fastener assembly includes a composite stud 40, a metallic, externally threaded sleeve 90, a metallic pin 65, a spring washer 75, a metal nut 94 and an optional nonmetallic spacer 73. The stud extends through the composite liner 30 and metal back structure 32. The pin 65 secures the threaded sleeve to the tip of the stud with the washer sandwiched between the sleeve and the back structure. The nut completes the assembly. Despite the merits of the disclosed fastener assembly, it suffers the shortcoming of relying on numerous small parts. Even under ideal conditions, assembly or disassembly of these parts can be quite arduous. In addition, installation or removal of the fastener assembly imparts torque to the stud. Torque application is undesirable because a composite stud, despite having good tensile strength, is susceptible to potentially damaging interlaminar shear stresses when exposed to torsion.

Ideally, a fastener assembly for a composite panel will also possess other desirable attributes. For example, when the panel and support are elements of a turbine engine component, no portion of the fastener assembly should project beyond the surface of the panel and into the engine gaspath. This is because the projecting portion of the fastener could introduce undesirable turbulence into the combustion gases or could be easily damaged by any debris or foreign objects present in the gases. In addition, there may be occasions when it is advantageous to avoid the use of threaded elements.

What is needed is a fastener assembly for securing a composite panel to a noncomposite support, and in particular a fastener assembly that relies on few parts, is isolated from torsion during assembly and disassembly, and is flush with the surface of the panel. In some applications, avoidance of threaded elements may also be advantageous.

SUMMARY OF THE INVENTION

It is, therefore, an object of the invention to secure a composite panel to a noncomposite support with a simple fastener assembly flush with the panel and isolated from torque application during assembly and disassembly. It is a further object to provide a threadless fastener assembly for those applications where a threaded fastener is undesirable.

According to the invention, a fastener for securing a composite panel to a noncomposite support includes a stud with a notched shank and a collar with a circumferentially extending rib. When assembled, the rib and the notch engage each other to resist axial translation between the stud and the collar. In one embodiment, a spring urges the rib into contact with the notch to tension the stud and clamp the panel to its support. In a second embodiment a nut engages an external thread on the collar to tension the stud and clamp the panel to its support. Either embodiment can be assembled and disassembled without imparting torque to the stud.

The principal advantages of the inventive fastener assembly are its simplicity and its ability to be assembled or disassembled without imparting torque to the stud. Another advantage is the option to secure a panel to a support with a completely a threadless fastener assembly.

These and other features and advantages will become more apparent from the following description of the best mode for carrying out the invention and the accompanying drawings.

BRIEF DESCRIPTION OF THE DRAWINGS

FIG. 1 is a cross sectional side elevation view of a panel secured to a support with a threadless fastener assembly according to a first embodiment of the present invention.

FIG. 2 is a perspective view showing a stud and collar comprising the fastener assembly of FIG. 1.

BEST MODE FOR CARRYING OUT THE INVENTION

Figure 3:
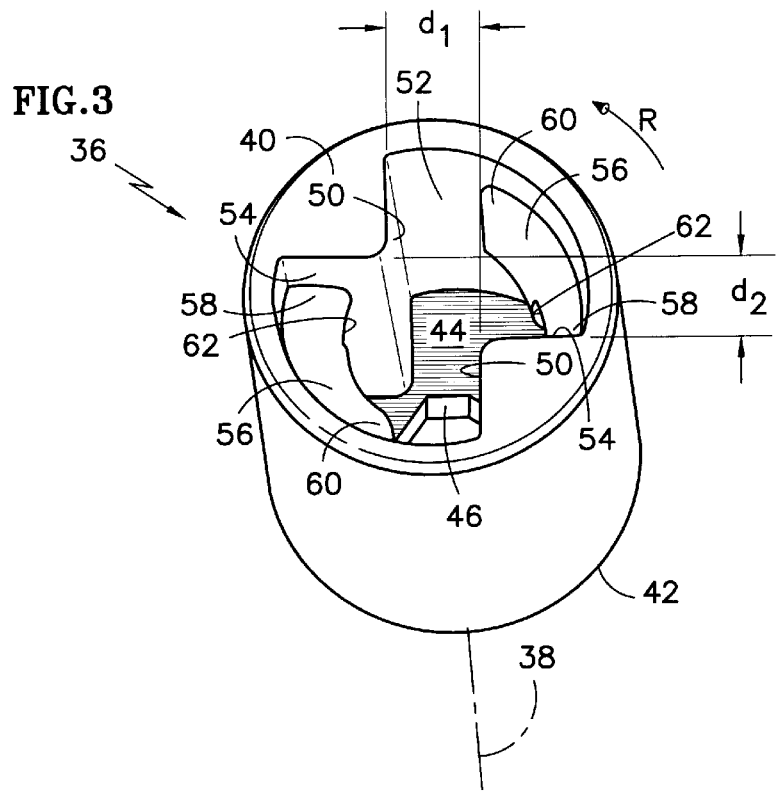
FIG. 3 is an enlarged perspective view of the collar of FIG. 2.

Referring to FIGS. 1 and 2, a liner assembly 10 comprises a noncomposite support structure 12 and a heat tolerant panel 14. The liner represents, for example, a combustion chamber, an exhaust nozzle or an afterburner liner in a turbine engine. The liner assembly 10 bounds an engine gaspath 16. Hot gaseous combustion products P flow longitudinally through the gaspath in the direction indicated. The noncomposite (usually metallic) support serves as a structural frame. The heat tolerant panel (usually composite) shields the support from the intense heat of the combustion gases to maintain the support within its operational limits. As a result, the engine can operate at significantly higher gas temperatures than would be possible with an all-metallic liner.

The support and panel are each penetrated by a multitude of openings such as beveled hole 18 penetrating the panel and aperture 20 penetrating the support. The openings have a rectangular profile corresponding to the rectangular profile of a stud described below.

A fastener assembly for securing the panel to the support includes a composite stud 22, similar to that shown in U.S. Pat. Nos. 6,042,315 and 6,045,310. The stud includes a head 24 and a shank 26 extending axially from the head. A pair of notches 28 near the tip 32 of the shank define a tail portion 34 of the shank. As seen best in FIG. 2, the stud has a rectangular profile.

Figure 4:
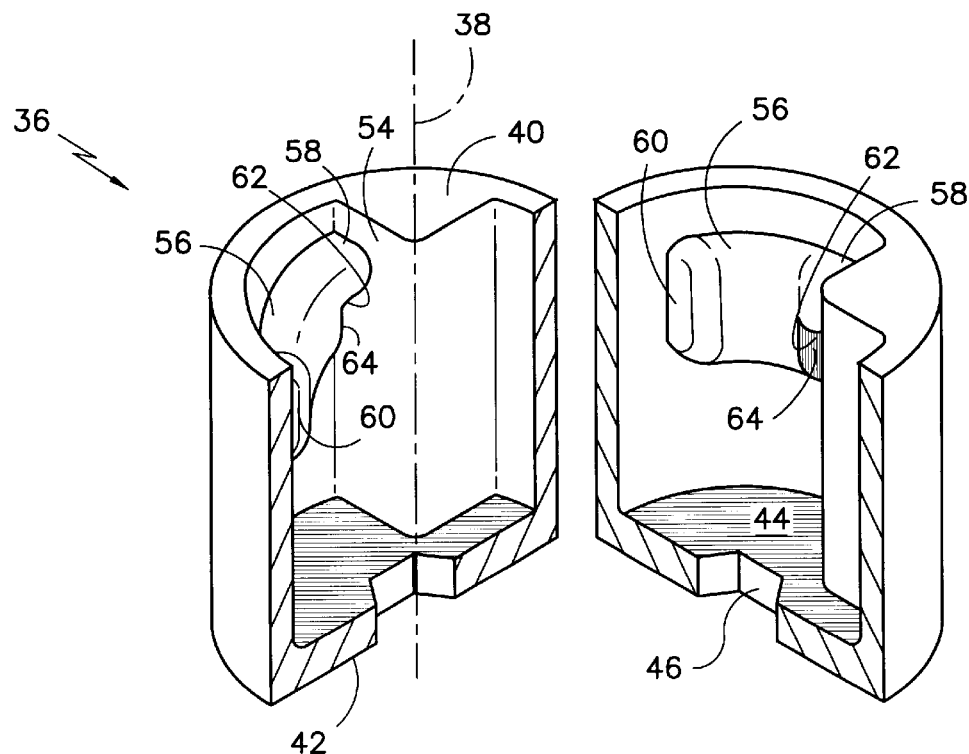
FIG. 4 is a view similar to FIG. 3 but with the collar artificially split open to expose its internal features.

Referring additionally to FIGS. 3 and 4, a collar 36, which circumscribes the stud, has an axis 38, a proximal end 40 and a distal end 42. The proximal end is substantially open to receive the stud shank 26. The distal end is largely closed by a floor 44, which acts as a positive stop to facilitate correct axial alignment of the collar with the stud. A hexagonal or similar faceted opening 46 penetrates the floor. The faceted opening is unnecessary for the threadless fastener assembly of FIGS. 1–5, but is highly desirable for a threaded embodiment discussed below.

The internal features of the collar include a pair of alignment surfaces 50 offset from each other by a distance $d_1$ to define a guide slot 52. The guide slot has a rectangular profile corresponding to the rectangular profile of the stud. The internal features also include a pair of rotation stop surfaces 54, offset from each other by a distance $d_2$. In the illustrated collar, distances $d_1$ and $d_2$ are equal.

Internal ribs 56 each extend circumferentially along the interior surface of the collar. Each rib is oriented substantially perpendicular to the axis 38, i.e. substantially parallel to the surfaces at the proximal and distal ends of the collar. Each rib has a closed end 58 integral with one of the rotation stop surfaces 54 and an open end 60 spaced from the opposite alignment surface 50. by at least distance $d_1$. Each rib is foreshortened near its rotation stop surface to define a recess 62 and a counterrotation shoulder 64.

Figure 5:
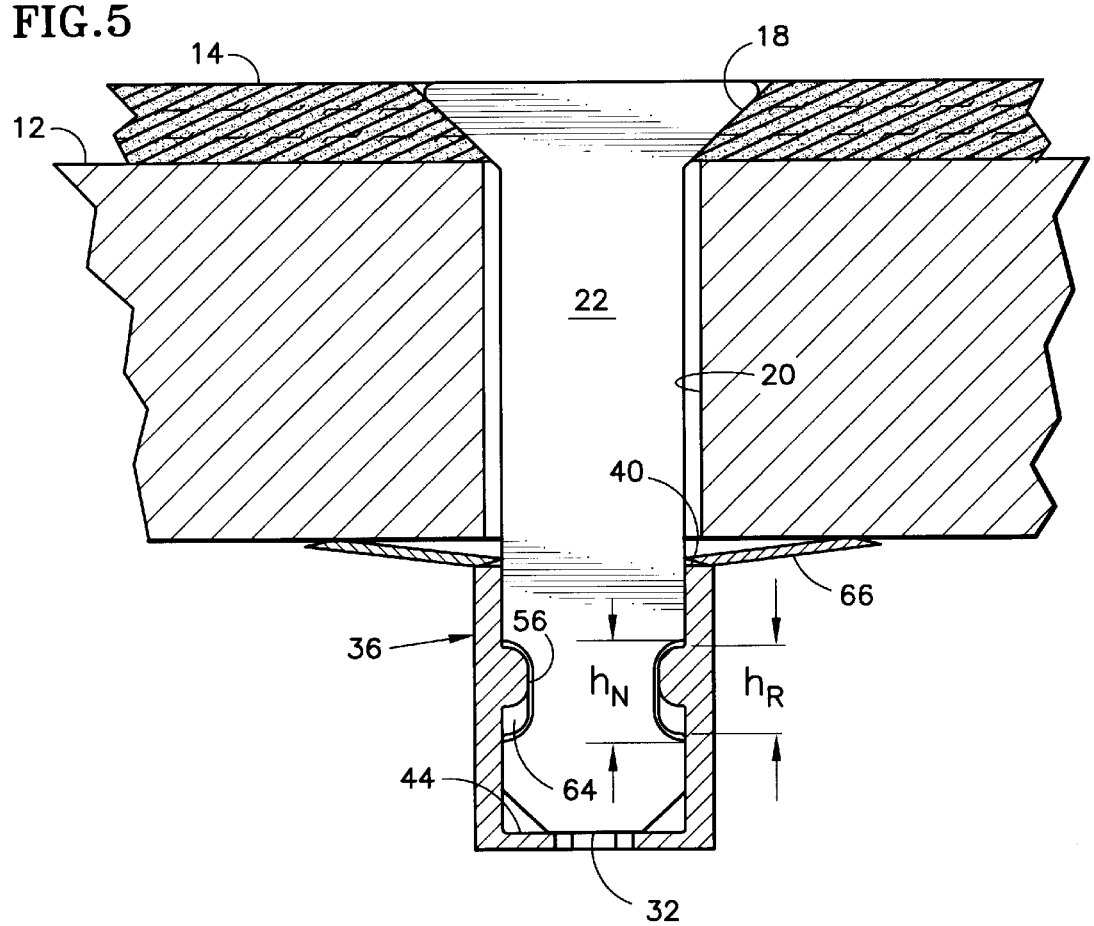
FIG. 5 is a view similar to that of FIG. 1 showing the fastener and collar in a nearly complete state of assembly.

Referring now to FIGS. 2 and 5, a technician assembles the panel 14 to the support 12 by inserting a stud through the aligned openings 18, 20 so that the head of the stud nests in the beveled hole. As indicated in FIG. 2, the technician then orients the collar to align the guide slot 52 with the rectangular profile of the stud. The technician then translates the collar onto the stud until its tip 32 contacts the floor 44 and spring 66 is compressed between the support 12 and the proximal end 40 of the collar. The technician then rotates the collar in direction R so that the open end of each rib 56 enters a corresponding notch in the stud. The technician continues rotating the collar until the rotation stop surfaces 54 contact the stud. The technician then releases the collar, allowing the spring 66 to translate the collar axially, which causes the stud tail 34 to enter the recesses 62 and the ribs 56 to contact their respective notches as seen in FIG. 1. The force securing the panel to the support is transferred through the interface 68 between the ribs and the notches. The engagement of the ribs with the notch resists axial translation between the stud and the collar. As long as the spring urges the collar axially as seen in FIG. 1, the stud tail 34 remains axially aligned with the counterrotation shoulders 64. As a result, the counterrotation shoulders can contact the stud tail to prevent counterrotation of the collar. However a technician can easily remove the fastener by translating the collar axially to recompress the spring and then reversing the assembly sequence described above. In the fully assembled state, friction at the force transfer interface 68 and at the spring/collar and spring/support interfaces 70, 72 offers some resistance to counterrotation of the collar. However, engagement between the counterrotation shoulders and the tail of the stud is the predominant agent for resisting counterrotation.

Because the ribs 56 are perpendicular to the rotational axis 38 of the collar, the collar can be installed and removed without imparting any appreciable, potentially damaging torque to the stud 22. This beneficial property can be amplified by making the rib height $h_R$ (FIG. 5) small enough in relation to the notch height $h_N$ to ensure axial clearance between the ribs and the notches during rotation of the collar. This is unlike a prior art construction shown in U.S. Pat. No. 5,620,291 in which "ribs" projecting from a cylindrical stem ride along a pair of ramps formed on the interior of a threadless, spring loaded nut. Friction between the ribs and the ramps resists rotation of the nut and, in doing so, imparts torque to the stem. The potentially damaging torque increases as the ribs ride further along the ramp and progressively compress the spring.

Because the above described embodiment of the fastener assembly is devoid of threads, the collar can be made of a lightweight composite material rather than of metal. This can be a significant advantage in weight sensitive applications such as aerospace products and components.

Figure 6:
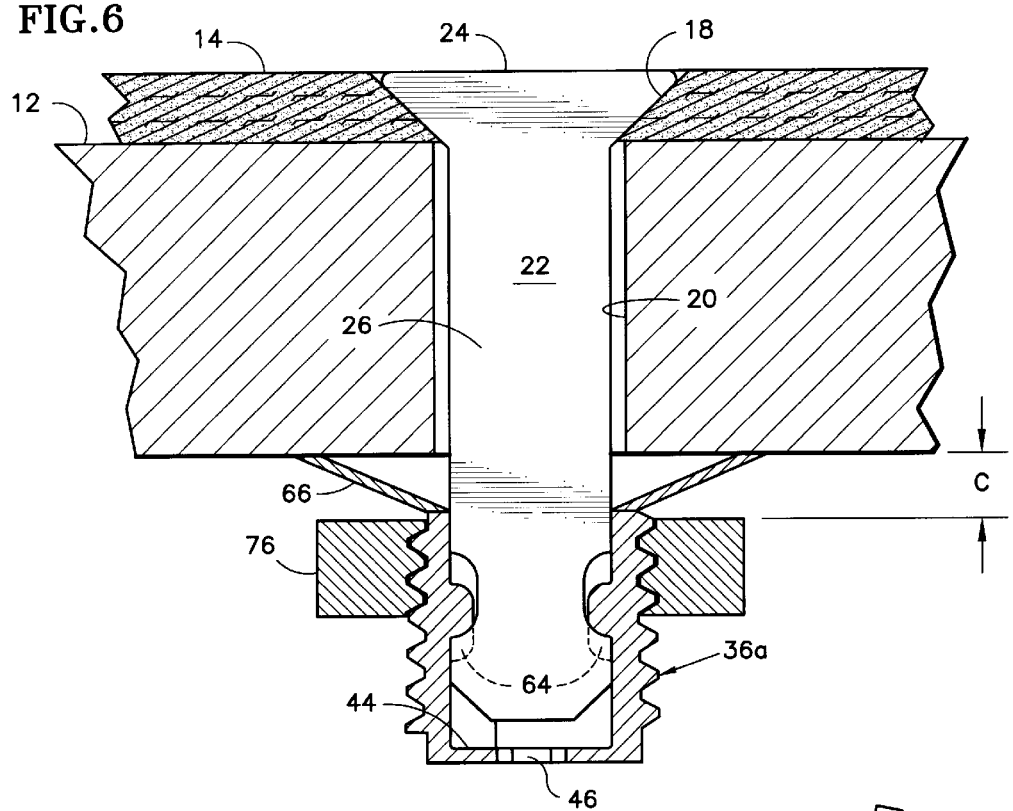
FIGS. 6 and 7 are views similar to those of FIGS. 1 and 2 but illustrating an alternative embodiment of the invention.
Figure 7:
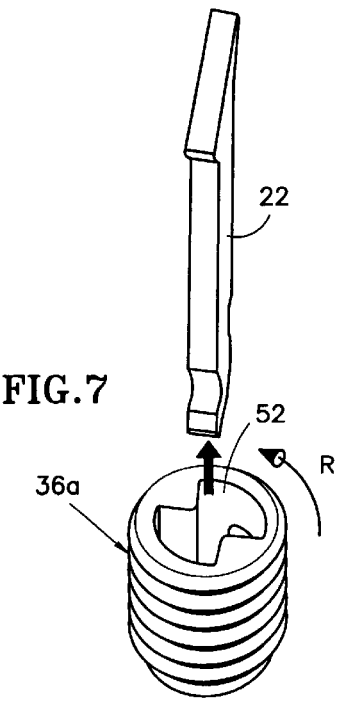

FIGS. 6 and 7 illustrate a second embodiment of the invention featuring, in lieu of threadless collar 36, an externally threaded collar 36a and a nut 76, threadably engageable with the collar. The floor 44 of collar 36a includes a faceted opening 46 like that shown in FIGS. 3 and 4. The facets act as a torque neutralizer as explained below.

The assembly sequence for the threaded embodiment of the inventive fastener mimics the assembly sequence for the threadless embodiment except that the final step of the sequence is to install nut 76 on the collar. The nut 76 and spring 66 cooperate with the collar and stud to exert an axial clamping force on the panel 14 and support 12. Alternatively, the spring may be dispensed with. However the presence of the spring may be desirable because the metal support undergoes a larger dimensional change than the composite stud and panel when exposed to elevated temperatures. This disparate thermal response can damage the fastener. The spring helps accommodate the disparate thermal response by providing a secure connection while also allowing some clearance C to accommodate thermal expansion.

The torque neutralizer helps isolate the composite stud from potentially damaging torsion during installation (or removal) of the nut. When a technician applies torque to tighten nut 76, the rotation stop surfaces 54 on the collar will tend to rotate the stud, which nevertheless remains immobilized because the rectangular head 24 nests irrotationally in rectangular beveled hole 18. To counteract this effect, the technician inserts an allen wrench in the faceted opening 46 and applies a countertourque to neutralize torque transmission to the stud. Although the torque neutralizer is shown as a plurality of facets forming the border of opening 46, other torque neutralizing features may also be employed. For example, the collar itself may have an externally faceted surface that extends axially beyond the threads so that a technician can use a conventional wrench to apply countertorque.

Because the collar 36a is threaded, it is recommended that it be made of a noncomposite material since a collar made of a composite material could be weakened by the threads.

With the salient features of the invention having been described, other features can now be better appreciated. The floor 44 serves not only as a stop to facilitate correct axial alignment of the ribs 56 with the notches 28, but also as a feature for preventing assembly errors. If the floor were not present, a technician could inadvertently slip the collar onto the stud with the collar distal end 42, rather than the proximal end 40 facing the support. As a result, the recess and counterrotation shoulder would be mispositioned relative to the tail of the stud, an error that might not be evident to the technician. As a result, the collar would be susceptible to counterrotation, which could cause the stud to come loose. Moreover, if this assembly error were to occur with the threaded embodiment, the act of threading a nut onto the collar would itself tend to counterrotate the collar.

Because the spring 66 resides between the support 12 and the collar 36 or 36a, rather than between the head 24 of the stud and the panel 14, the spring pulls the head flush with the panel so that no portion of the fastener assembly projects beyond the surface of the panel and into the engine gaspath. Instead, projecting portions of the fastener assembly extend beyond the support panel and are therefore of little or no consequence.

Although the spring is illustrated as a separate part, it may be made an integral part of the support or of the collar.

Although this invention has been shown and described with reference to a detailed embodiment thereof, it will be understood by those skilled in the art that various changes in form and detail may be made without departing from the invention as set forth in the accompanying claims.

We claim:

1. A fastener for securing a panel to a support, comprising:
   a stud configured to project through aligned openings in the panel and the support, the stud having a head and a shank extending axially from the head, the shank having a notch;
   a collar circumscribing the shank, the collar having an axis and including a circumferentially extending rib oriented substantially perpendicular to the axis, the rib engaging the notch to resist axial translation between the stud and the collar; and
   an axially acting spring for urging the rib into contact with the notch.

2. The fastener of claim 1 wherein the rib includes a counterrotation shoulder.

3. The fastener of claim 2 wherein engagement between the counterrotation shoulder and the stud is the predominant agent for resisting counterrotation between the stud and the collar.

4. The fastener of claim 1 wherein the head of the stud is adjacent to the panel, the collar is adjacent to the support and the spring resides axially intermediate the collar and the support.

5. The fastener of claim 1 wherein the panel and stud are each made of a composite material.

6. The fastener of claim 5 wherein the collar is made of a composite material.

7. The fastener of claim 1 wherein the collar includes a stop to axially align the notch with the rib.

8. A liner assembly, comprising:
   a support penetrated by an aperture;
   a panel penetrated by a hole aligned with the aperture;
   a stud projecting through the aperture and hole, the stud having a head adjacent to the panel and a shank extending axially from the head, the shank having a notch;
   a collar adjacent to the support and circumscribing the shank, the collar having an axis and including a circumferentially extending internal rib oriented substantially perpendicular to the axis, the rib engaging the notch to resist axial translation between the stud and the collar; and
   an axially acting spring for urging the rib into contact with the notch.

9. A fastener for securing a panel to a support, comprising:
   a stud configured to project through aligned openings in the panel and the support, the stud having a head and a shank extending axially from the head, the shank having a notch;
   a collar circumscribing the shank, the collar having an axis and including an external thread and an internal, circumferentially extending rib, the rib engaging the notch to resist axial translation between the stud and the collar; and
   a nut threadably engagable with the collar and cooperating with the collar and stud to exert an axial clamping force on the panel and the support.

10. The fastener of claim 9 wherein the collar includes a torque neutralizer.

11. The fastener of claim 10 wherein the torque neutralizer comprises a plurality of facets.

12. The fastener of claim 9 wherein the rib is oriented substantially perpendicular to the axis.

13. The fastener of claim 9 wherein the rib includes a counterrotation shoulder.

14. The fastener of claim 9 wherein the head of the stud is adjacent to the panel, the collar is adjacent to the support and a spring resides axially intermediate the collar and the support.

15. The fastener of claim 9 wherein the panel and stud are each made of a composite material.

16. The fastener of claim 15 wherein the collar is made of a noncomposite material.

17. The fastener of claim 9 wherein the collar includes a stop to axially align the notch with the rib.

18. A liner assembly, comprising:
   a support penetrated by an aperture;
   a panel penetrated by a hole aligned with the aperture;
   a stud projecting through the aperture and hole, the stud having a head adjacent to the panel and a shank extending axially from the head, the shank having a notch;
   a collar adjacent to the support and circumscribing the shank, the collar having an axis and including external threads and a circumferentially extending internal rib oriented substantially perpendicular to the axis, the rib engaging the notch to resist axial translation between the stud and the collar, the collar also including a torque neutralizer;
   an axially acting spring residing axially intermediate the collar and the support; and
   a nut threaded onto the collar.

* * * * *